US012644746B2

(12) United States Patent
Trabattoni et al.

(10) Patent No.: US 12,644,746 B2
(45) Date of Patent: Jun. 2, 2026

(54) DEVICE FOR DISPENSING A FLUID SUBSTANCE, USUALLY A NUTRACEUTICAL SUBSTANCE OR A DRUG OR A FOOD

(71) Applicant: BORMIOLI PHARMA S.P.A., Milan (IT)

(72) Inventors: Riccardo Trabattoni, Seregno (IT); Andrea Maldifassi, Milan (IT)

(73) Assignee: BORMIOLI PHARMA S.P.A., Milan (IT)

( * ) Notice: Subject to any disclaimer, the term of this patent is extended or adjusted under 35 U.S.C. 154(b) by 145 days.

(21) Appl. No.: 18/699,981

(22) PCT Filed: Oct. 17, 2022

(86) PCT No.: PCT/IB2022/059938
§ 371 (c)(1),
(2) Date: Apr. 10, 2024

(87) PCT Pub. No.: WO2023/067473
PCT Pub. Date: Apr. 27, 2023

(65) Prior Publication Data
US 2024/0271977 A1      Aug. 15, 2024

(30) Foreign Application Priority Data
Oct. 21, 2021     (IT) ........................ 102021000027029

(51) Int. Cl.
*G01F 11/02*          (2006.01)
*B05B 11/00*          (2023.01)
*G01F 11/28*          (2006.01)
(52) U.S. Cl.
CPC ........ *G01F 11/028* (2013.01); *B05B 11/0032* (2013.01); *B05B 11/0038* (2018.08); *G01F 11/28* (2013.01)

(58) Field of Classification Search
CPC ...... G01F 11/028; G01F 11/025; G01F 11/28; G01F 11/286; G01F 11/36; B05B 11/0038; B05B 11/0032
USPC .......................... 222/23, 158; 220/708, 711
See application file for complete search history.

(56) References Cited

U.S. PATENT DOCUMENTS

| | | | | |
|---|---|---|---|---|
| 6,609,624 B2 * | 8/2003 | Goto | .................. | A47G 19/2266 |
| | | | | 220/709 |
| 9,321,064 B2 | 4/2016 | Vanier | | |
| 2011/0079613 A1 | 4/2011 | Tsung | | |
| 2019/0321840 A1 * | 10/2019 | Lamberto | ............... | G01F 11/32 |
| 2022/0040909 A1 | 2/2022 | Webster | | |

FOREIGN PATENT DOCUMENTS

JP          2009227307          10/2009

OTHER PUBLICATIONS

International Search Report and Written Opinion, issued Jan. 9, 2023 in PCT/IB2022/059938, 9 pages.

* cited by examiner

*Primary Examiner* — David J Walczak
(74) *Attorney, Agent, or Firm* — Chrisman Gallo Tochtrop LLC

(57) ABSTRACT

A device for dispensing a fluid substance including: a container (6) of the substance; a measuring cup (2) for dosing the substance; a manual pumping means (3) of the substance from the container (6) to the measuring cup (2); a dispenser (4) of the substance from the measuring cup (2) suitable to allow a user to drink the substance.

8 Claims, 6 Drawing Sheets

DEVICE FOR DISPENSING A FLUID SUBSTANCE, USUALLY A NUTRACEUTICAL SUBSTANCE OR A DRUG OR A FOOD

TECHNICAL FIELD

The present invention relates to a device for dispensing a fluid substance, usually a nutraceutical substance or a drug or a food.

BACKGROUND ART

Hand soap dispensing devices are known, comprising a container filled with soap. A dispenser associated with the container comprises a dispensing head provided with an outlet mouth. To withdraw the soap, the user compresses the dispensing head towards the container, operating a manual pump. The manual pump introduces air into the container and allows the soap to be dispensed from the outlet mouth.

Such a solution does not allow to control the amount of product dispensed. At most, by pressing the dispensing head a little, the user will be able to dispense a lower amount of product with respect to a situation in which the dispensing head is pressed more deeply.

Bottles of medicinal products are further known in which the dosage of the substance present in the bottle occurs by pouring it into a graduated measuring cup by gravity. The user thus tilts the bottle, bringing a dispensing mouth closer to the measuring cup. Such a solution is not lacking drawbacks. For example, the user could spill a part of the substance, dirtying (sometimes the substance is also sticky). Furthermore, looking at the graduated scale (to allow the correct dosage) while pouring the substance is not easy and increases the risk of dirtying.

DISCLOSURE OF THE INVENTION

In this context, the technical task underlying the present invention is to propose a dispensing device which can be used for applications such as dispensing a nutraceutical substance or a drug or a food, therefore an application in which the exact control of the amount of product dispensed is very important.

In particular, it is an object of the present invention to provide a dispensing device which enables facilitating the administration of a precise amount of a given substance. The technical task set and the objects specified are substantially attained by a dispensing device comprising the technical features as set out in one or more of the accompanying claims.

BRIEF DESCRIPTION OF DRAWINGS

Further features and advantages of the present invention will become more apparent from the indicative and thus non-limiting description of a preferred but non-exclusive embodiment of a dispensing device, as illustrated in the appended drawings, in which.

DETAILED DESCRIPTION OF PREFERRED EMBODIMENTS OF THE INVENTION

Figure 1:
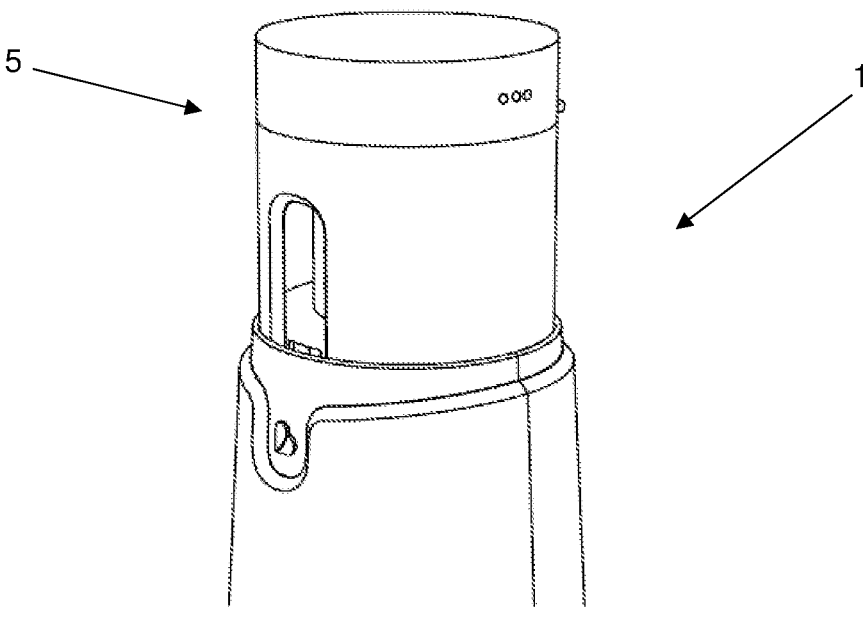
FIGS. 1-3 show a portion of the dispensing device in distinct configurations.

In the appended figures of the drawings, reference numeral 1 denotes a device for dispensing a fluid substance. Examples of a fluid substance are a liquid, a viscous substance such as a syrup. Such a substance is usually a nutraceutical substance or a drug or a food. The device 1 comprises a container 6 of the substance.

The dispensing device 1 comprises a measuring cup 2 for dosing the substance. Such a measuring cup allows a correct dosage of the substance present in the container. This advantageously occurs without extracting the product from the device 1.

Figure 7:
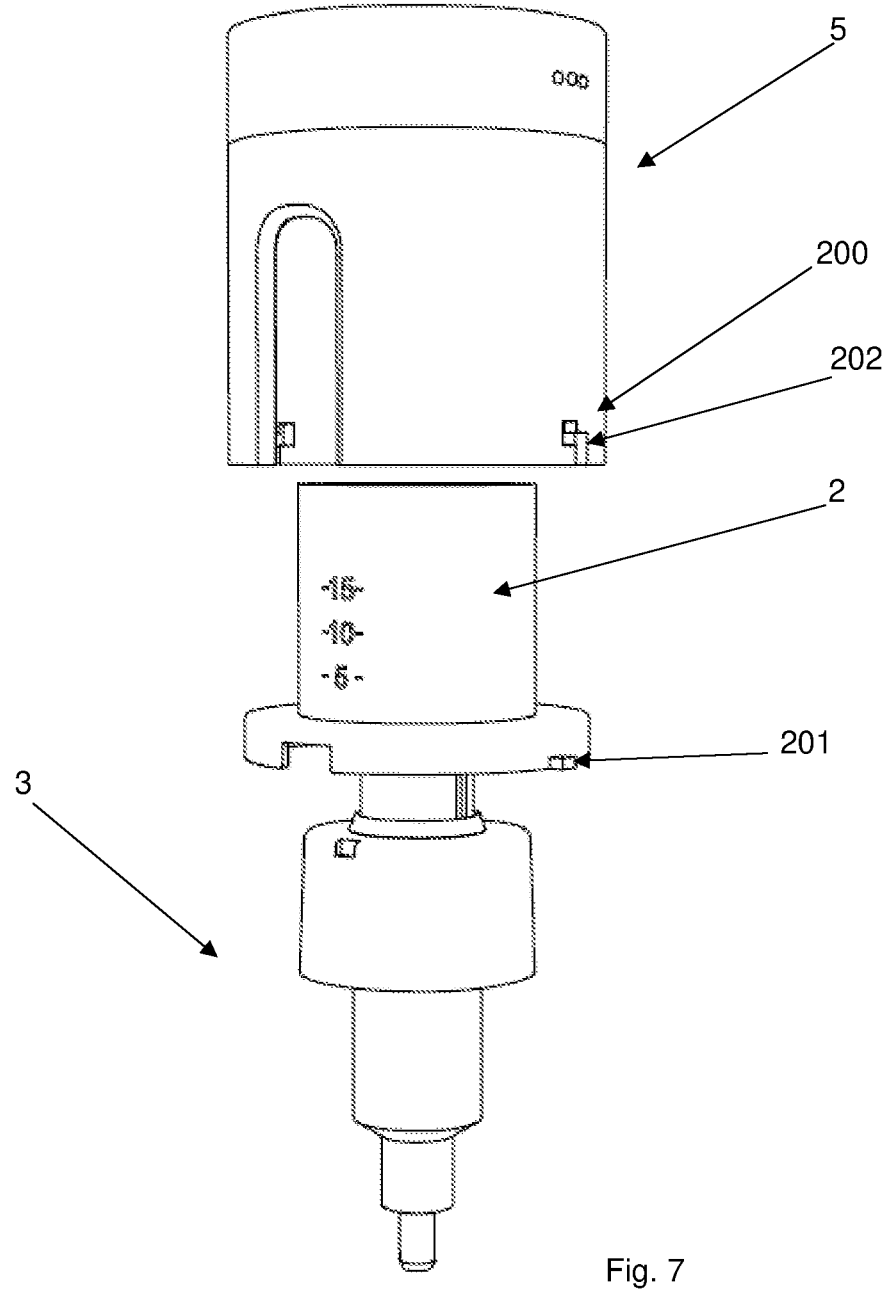
FIG. 7 shows an exploded view of a component of the dispensing device according to the present invention.

Such a measuring cup 2 can for example comprise a graduated scale (see for example FIG. 7). The measuring cup 2 could comprise a notch indicating a predetermined amount. For example, a notch could indicate a dose of substance to be taken. There could also be more notches (not necessarily graduated).

Advantageously, if present, the graduated scale can be read according to two opposite orientations. This facilitates reading both if the dispensing device 1 is oriented according to a predetermined direction and if it is rotated 180° around a horizontal axis. Therefore, the graduated scale can be read both with the device 1 in a first configuration and with the device 1 upside down with respect to the first configuration.

The device 1 also comprises pumping means 3 for pumping the substance from the container 6 to the measuring cup 2. The pumping means 3 is manual. The pumping means 3 comprises a pumping element 30 for pumping air in the container 6 to allow the dispensing of the substance. In fact, the entry of air into the container forces the exit of the substance present therein. Suitably, the pumping means 3 comprises guide means of the pumping element 30. In fact, the pumping element 30 can suitably translate in opposite directions along a straight line. The pumping means 3 comprises a suction pipe 33. It protrudes inside the container 6. It allows to withdraw the substance present in the container 6 and dispense it in the measuring cup 2. Suitably, the suction pipe 33 extends for at least 75% of the height of the container 6. Advantageously, the suction pipe 33 touches the bottom of the container 6.

The device 1 comprises a dispenser 4 of the substance from the measuring cup 2. Such a dispenser 4 is suitable to allow a user to drink the substance. The dispenser 4 allows to withdraw the substance present in the measuring cup 2. It does not, however, allow to withdraw the substance present in the container 6 (at least until the substance is placed in the measuring cup 2 with the pumping means 3).

Suitably, the device 1 comprises a cover 5 of the measuring cup 2 and/or of the dispenser 4.

The cover 5 assumes a rest position and an operating position. The passage from the rest position to the operating position causes the operation of the pumping means 3. In the rest position, the cover 5 is more distanced from the container 6 with respect to the operating position.

Suitably, the pumping element 30 is located at a base of the measuring cup 2 or in any case between the measuring cup 2 and the container 6. Suitably, the device 1 further comprises a closing cap 35 of a mouth of the container 6. Suitably, the closing cap 35 has a passage for the transit of the pumping means 3. The cap 35 is advantageously screwed on the container 6.

The cap 5 is integrally movable with the pumping element 30. In particular, it is the cover 5 which causes the operation of the pumping element 30. The user thus acts directly on the cover 5 to operate the pumping element 30.

Suitably, the pumping means 3 is elastically retro-operated. In the absence of an external force, this pushes the cover 5 from the operating position to the rest position.

Figure 2:
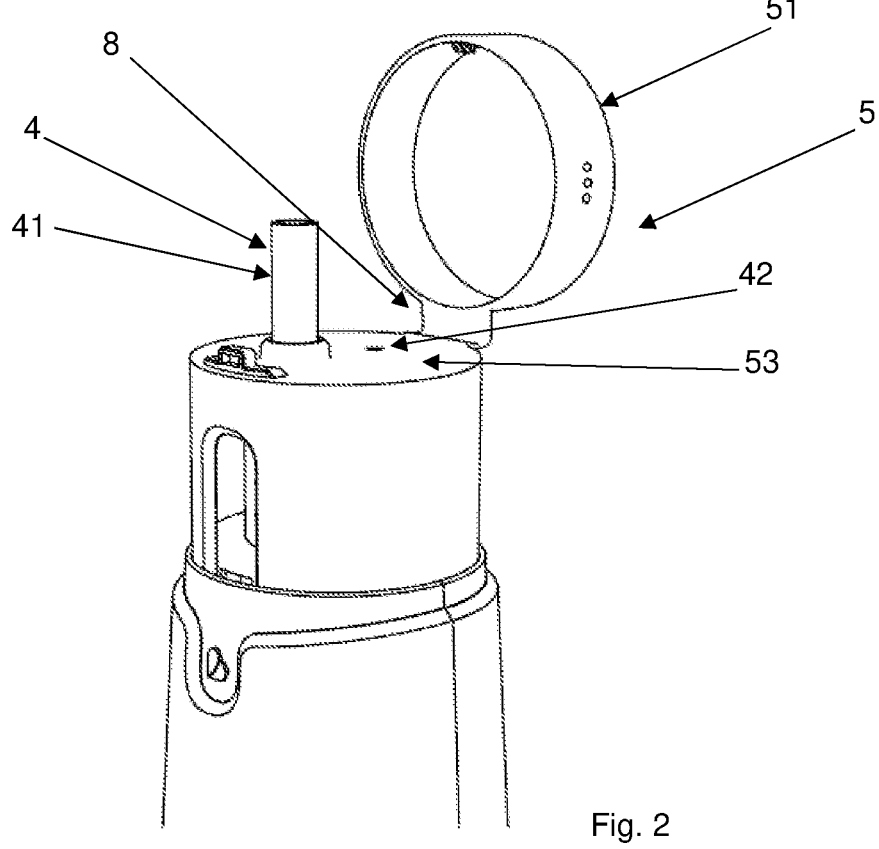
Figure 3:
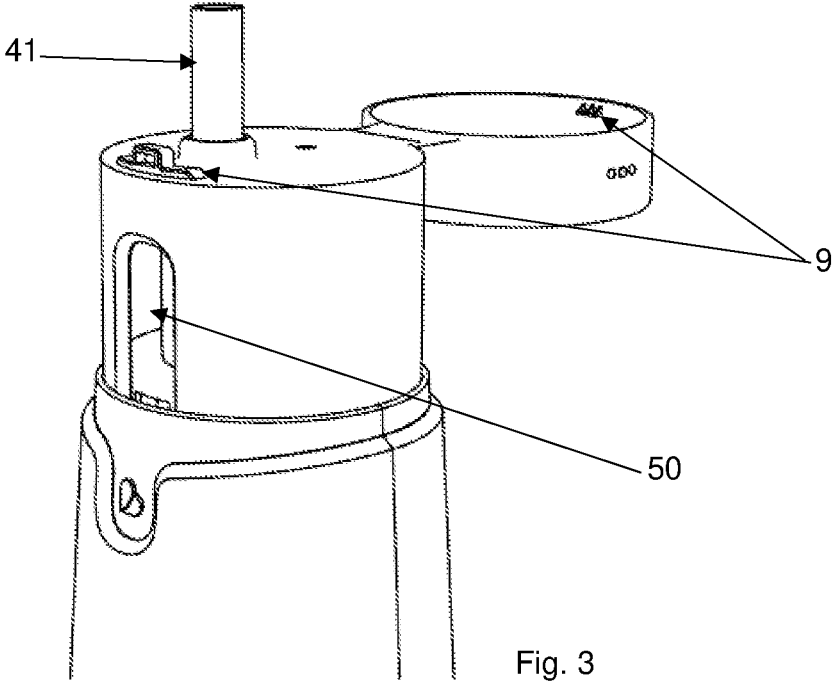

The dispenser 4 comprises a spout 41. The cover 5 comprises a door 51 movable between a closed configuration (see FIG. 1) in which it delimits at least in part a compartment 52 in which the spout 41 is located and an open configuration in which it makes the spout 41 accessible to a user (see FIGS. 2 and 3). In the open configuration, the spout 41 is directly accessible from the outside.

The cover 5 comprises a septum 53 on which the cover 5 closes to define the compartment 52. Such a septum 53 suitably comprises an air passage hole 42 which passes through its thickness. This allows the entry of air into the measuring cup 2, facilitating the outflow of the substance from the measuring cup 2. Advantageously, the air passage hole 42 has a surface area less than 4 mm$^2$.

Suitably, the spout 41 is flexible. Usually, the spout 41 is a straw. Suitably, the spout 41 is made of silicone.

The spout 41 is deformable and spontaneously evolves towards an undeformed configuration. In the closed configuration of the door 51, the spout 41 is deformed by the pressure of the door 51, in the open configuration it evolves towards said deformed configuration.

Suitably, the measuring cup 2 defines at least in part a chamber 20 for dosing the substance. The cover 5 occludes and delimits the chamber 20. The measuring cup 2 is therefore interposed between the cover 5 and the container 6 or in any case between the cover 5 and the pumping means 3. The pumping means 3 also comprises an outlet end 32 for the substance. The outlet end 32 is opposite the inlet end 31 for the substance. The outlet end 32 is associated with the measuring cup 2.

Advantageously, the pumping means 3 comprises a delivery duct 34 which opens into the measuring cup 2; such a delivery duct 34 is for example an extension of the suction pipe 33. An end section 340 of the delivery duct 34 can possibly be abutted by the cover 5 which obstructs it at least partially. Suitably, the end section 340 of the delivery duct 34 is abutted by a portion of the cover 5 delimiting the chamber 20. Suitably, the duct 34 comprises at least one lateral opening which allows the substance coming from the pumping means 3 to outflow into the measuring cup 2.

The cover 5 is removably connected to the measuring cup 2. This facilitates the cleaning thereof. In particular, the cover 5 is connected to the measuring cup 2 by bayonet means 200 (see FIG. 7). The bayonet means 200 is advantageously placed in part on the measuring cup 2 and in part on the cover 5 and interacts with each other. In particular, the bayonet means 200 comprises one or more projections 201 which engage in corresponding grooves 202. Suitably, at least one groove 202 of the bayonet means 200 extends defining at least one change of direction or rather two changes of direction. For example, said one or more projections 201 are obtained on the measuring cup 2 and the corresponding groove(s) 202 is/are obtained in the cover 5.

The cover 5 laterally wraps the measuring cup 2. An annular gap 50 is interposed between the cover 5 and the measuring cup 2. The measuring cup 2 therefore has a narrower section (transverse to the longitudinal extension of the device 1) than the cover 5. This allows the substance to be dosed more precisely since a lower amount of substance is needed to increase the level in the measuring cup 2.

Suitably, the cover 5 comprises a window 55 which allows viewing a portion of the measuring cup 2. Thereby, the user can see through the cover 5 to note the degree of filling of the measuring cup 2. For example, the window 55 could be superimposed on a graduated scale. The window 55 could be an opening or comprise a transparent area. Suitably, the remaining parts of the cover 5 are in fact opaque.

Suitably, the door 51 can be constrained to the remaining parts of the cover 5 with constraining means 8 which allows the opening thereof. Advantageously, the constraining means 8 allows the door 51 to remain constrained to the remaining parts of the cover 5 even in the open configuration (for example to avoid the door 51 dropping with the opening). For example, the constraining means 8 could comprise a plastic hinge which connects the door 51 to the remaining parts of the cover 5 (see FIG. 2). In an alternative solution, the constraining means could comprise a strip (for example a cord) connecting the door 51 to the remaining parts of the cover 5 (see FIG. 4).

Suitably, the cover 5 could be retained in the closing configuration by locking means 9. Such means 9 could comprise snap connection means (see FIG. 3). For example, they could comprise deformable elements which engage in a corresponding seat. Advantageously, the snap connection means could be disengaged by means of two buttons arranged along at least two different positions of the door 51, in particular in two different positions of the perimeter of the door 51. Suitably, the simultaneous actuation of the snap connection means makes the opening "child proof".

Figure 4:
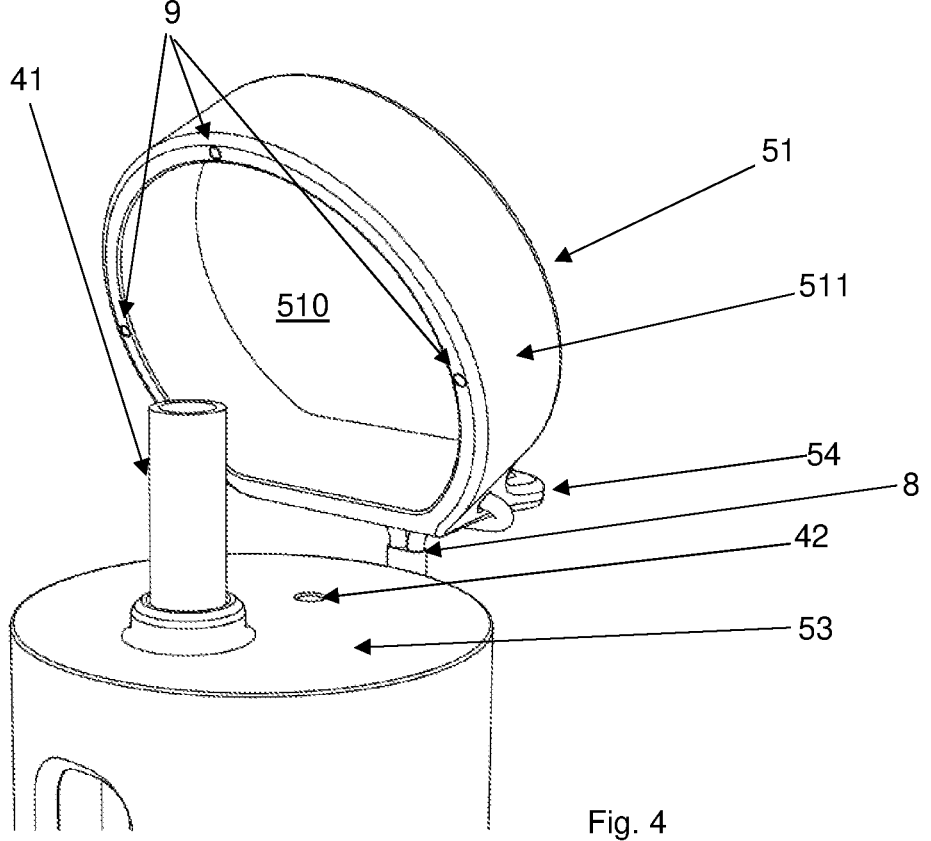
FIG. 4 shows a detail of an alternative solution.

In an alternative solution, the locking means 9 could be magnetic means (see FIG. 4). Suitably, at least one magnet could be integrated in the door 51 and in the remaining parts of the cover 5 (advantageously in an area which faces/is in contact with the door 51 in the closed configuration). Suitably, the door 51 can comprise an upper base 510. A lateral side 511 suitably extends (which suitably protrudes towards the measuring cup 2 in the closed configuration) from the upper base 510. Suitably, the door 51 comprises a tab 54 which in the closed configuration of the door 51 protrudes from the base 510 away from the measuring cup 2 (see FIG. 4). Such a tab 54 facilitates a user to open the door 51 by gripping the device 1 and leveraging with an external support, for example the edge of a table.

Figures 5, 6:
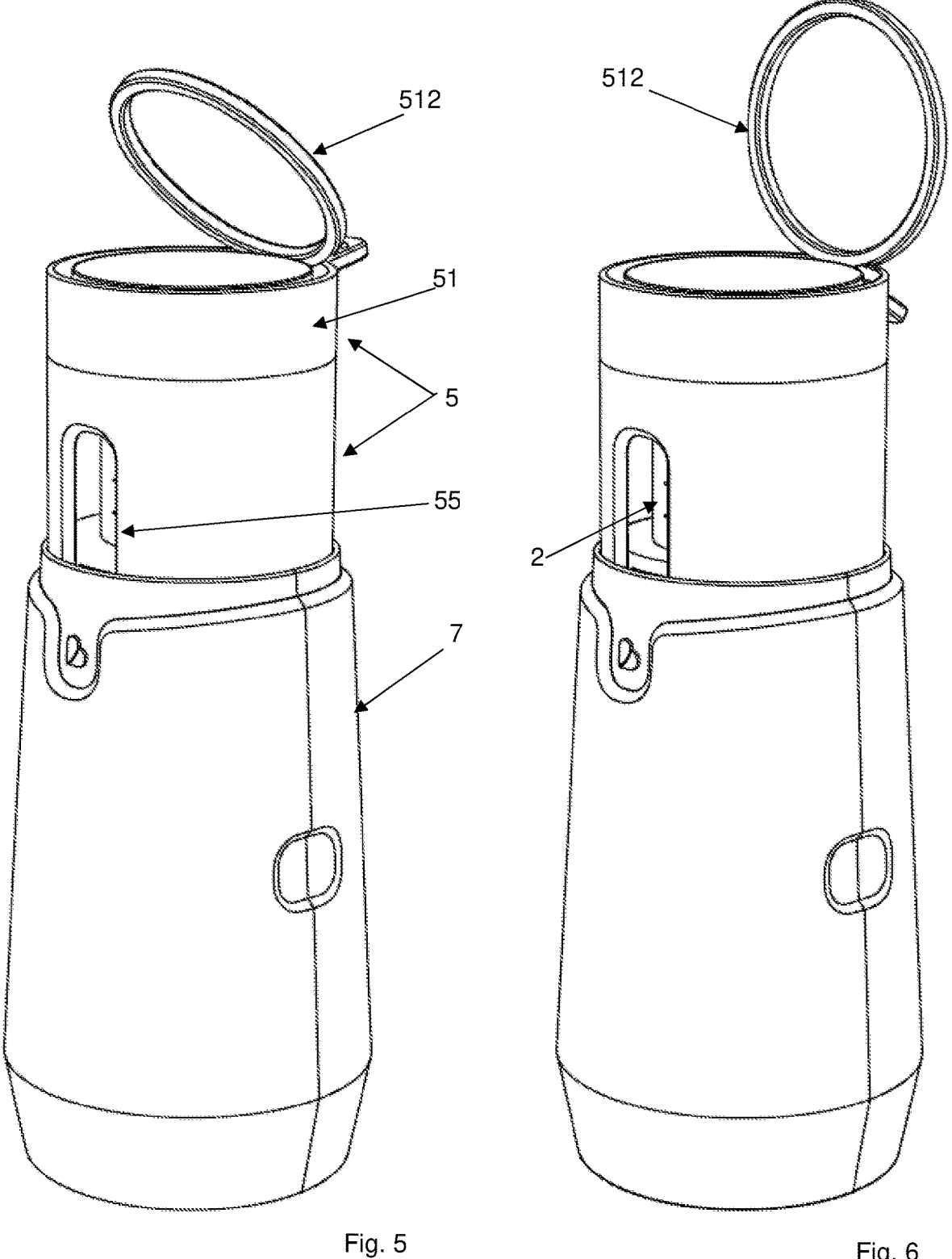
FIGS. 5 and 6 show a further alternative solution with a component in distinct configurations.

Suitably, the door 51 can comprise an annular element 512 (see FIGS. 5 and 6). It is movable between a retracted configuration in which it overlaps the base 510 and an extracted configuration. The retracted configuration is a configuration occupying minimum space. In the extracted configuration (FIGS. 5 and 6), the annular element 512 defines gripping means which can facilitate opening the door 51 and could possibly allow the device 1 to be hung. Suitably, the operation of the annular element 512 occurs by means of the tab 54.

Figure 8:
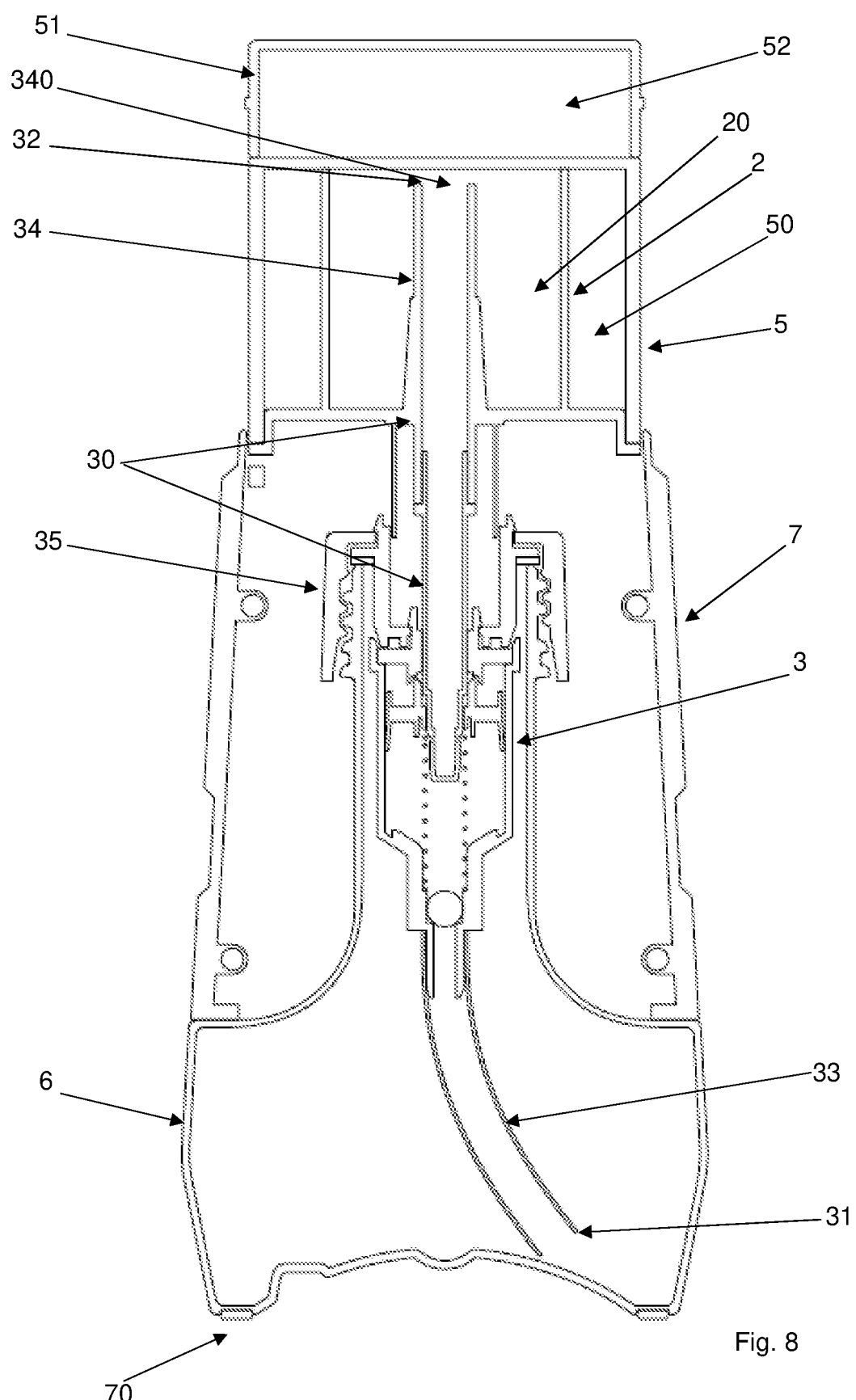
FIGS. 8 and 9 show in section two alternative solutions of the dispensing device according to the present invention.
Figure 9:
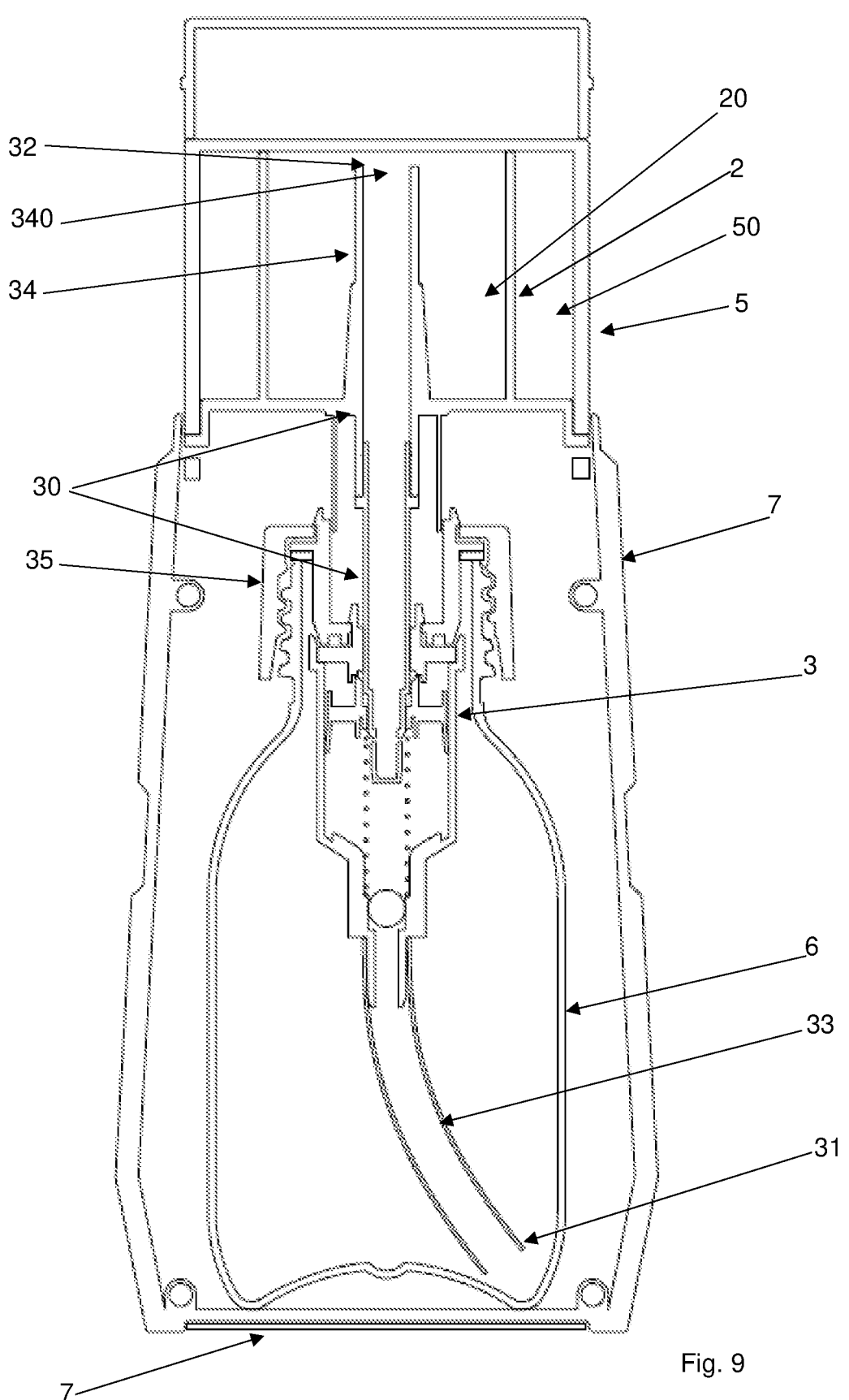

Suitably, the dispensing device 1 comprises a case 7 at least partially housing the container 6 and the pumping means 3. In a particular embodiment, the container 6 protrudes outside the case 7 (see FIG. 8). For example, the container 6 protrudes outside the case 7 on an opposite side with respect to the position in which the measuring cup 2 is located. The case 7 could therefore have a tubular shape. In an alternative solution, the container 6 is entirely contained in the case 7 (see FIG. 9). Suitably, the case 7 comprises two or more removably connectable half-shells. The half-shells can then be separated, allowing access to the container 6. Suitably, the case 7 can comprise one or more stops for the stable positioning of the container 6 therein. Such stops can for example be protrusions or counter-shapes.

Advantageously, the device 1 comprises a lower base 70. Suitably, the lower base 70 comprises anti-slip means. For example, it could be integrated in the case 7 or in the container 6. This is to limit the risk of the device slipping and falling from a shelf.

Further object of the present invention is a method for dispensing a fluid substance by means of a device having one or more of the features described previously.

As mentioned above, the substance is advantageously a nutraceutical substance or a drug or a food.

The method comprises the steps of:

dosing a predetermined amount of substance by means of the measuring cup 2; the step of dosing said predetermined amount of substance comprises the step of pumping air inside the container 6 by means of the pumping means 3 causing the passage of the substance from the container 6 to the measuring cup 2 without transiting outside the device 1;

dispensing by means of the dispenser 4 the substance previously placed in the measuring cup 2.

Advantageously, the step of pumping air inside the container by means of the pumping means 3 is performed by moving a pumping element 30 of the pumping means 3 between a stroke start position and a stroke end position. Each time the pump 30 moves between the stroke start position and the stroke end position, an amount corresponding to the interval between two predetermined levels indicated on the measuring cup (or a multiple or a sub-multiple of such an interval) is moved from the container 6 to the measuring cup 2. Thereby, by performing a predetermined number of pumpings, it is possible to obtain the desired dosage.

The present invention achieves important advantages.

Firstly, it allows a substance to be dispensed precisely from a container without the risk of dirtying the surrounding areas (in particular with substances such as syrups or other sticky substances). In fact, the user does not perform a dosage by pouring the product into an external measuring cup separated from the device 1. Everything is integrated in the device 1. Furthermore, once the substance is dosed, the user can use the dispenser 4 to take it. Also in this case, a transfer into an external dosing device is not necessary.

It further allows maximum ergonomics. In fact, the user is facilitated in the opening, being able to easily intervene.

The invention as it is conceived is susceptible to numerous modifications and variants, all falling within the scope of the inventive concept characterised thereby. Furthermore, all the details can be replaced with other technically equivalent elements. In practice, all the materials used, as well as the dimensions, can be any whatsoever, according to need.

The invention claimed is:

1. A device for dispensing a fluid substance comprising:
a container (6) for containing the substance;
a measuring cup (2) for dosing the substance;
a manual pumping means (3) for pumping the substance from the container (6) to the measuring cup (2);

a dispenser (4) for dispensing the substance from the measuring cup (2) suitable to allow a user to drink the substance; the dispenser (4) comprising a spout (41);

a cover (5) for the measuring cup (2) and the dispenser (4); said cover (5) assuming a rest position and an operating position; a passage from the rest position to the operating position causing an operation of the pumping means (3); the pumping means (3) comprising a pumping element (30) for pumping air in the container (6), said cover (5) being integrally movable with the pumping element (30); the cover (5) comprising a door (51) movable between a closed configuration in which the door (51) delimits at least in part a compartment (52) in which the spout (41) is located and an open configuration in which the door (51) makes the spout (41) accessible to a user; the spout (41) being deformable and spontaneously evolving towards an undeformed configuration; in the closed configuration of the door (51) the spout (41) being deformed by a pressure of the door (51), in the open configuration assuming said undeformed configuration.

2. The device according to claim 1, characterised in that the measuring cup (2) defines a chamber (20) for dosing the substance; said cover (5) occluding and delimiting said chamber (20).

3. The device according to claim 2, characterised in that the pumping means (3) comprises a delivery duct (34) for delivering the substance, said delivery duct (34) opening into the measuring cup (2).

4. The device according to claim 3, characterised in that an end section (340) of the delivery duct (34) is abutted by a portion of the cover (5) which delimits the chamber (20).

5. The device according to claim 1, characterised in that the cover (5) is removably connected to the measuring cup (2).

6. The device according to claim 1, characterised in that the cover (5) laterally wraps the measuring cup (2); an annular gap (50) being interposed between the cover (5) and the measuring cup (2).

7. The device according to claim 1, characterised in that the pumping means (3) comprises a delivery duct (34) for delivering the substance, said delivery duct (34) opening into the measuring cup (2).

8. A method for dispensing a fluid substance by means of a device according to claim 1, characterised in that said method comprises the steps of:

dosing a predetermined amount of substance by means of the measuring cup (2); the step of dosing said predetermined amount of substance comprising the step of: pumping air inside the container (6) by means of the pumping means (3) causing a passage of the substance from the container (6) to the measuring cup (2) without transiting outside the device (1);

dispensing by means of the dispenser (4) the substance previously placed in the measuring cup (2); said substance being a nutraceutical substance or a drug or a food.

* * * * *